United States Patent [19]

Schmidt et al.

[11] 4,401,802

[45] Aug. 30, 1983

[54] PROCESS FOR THE PREPARATION OF THERMOPLASTIC AROMATIC POLYPHOSPHONATOCARBONATES WITH IMPROVED HEAT-AGEING RESISTANCE, AND THEIR USE

[75] Inventors: Manfred Schmidt, Pittsburgh, Pa.; Ludwig Bottenbruch; Dieter Freitag, both of Krefeld, Fed. Rep. of Germany

[73] Assignee: Bayer Aktiengesellschaft, Leverkusen, Fed. Rep. of Germany

[21] Appl. No.: 224,077

[22] Filed: Jan. 12, 1981

[30] Foreign Application Priority Data

Jan. 19, 1980 [DE] Fed. Rep. of Germany ....... 3001863

[51] Int. Cl.$^3$ .............................................. C08G 63/62
[52] U.S. Cl. .................................... 528/167; 528/169; 528/196; 528/198; 528/204
[58] Field of Search ................................ 528/167, 169

[56] References Cited

U.S. PATENT DOCUMENTS

| | | | |
|---|---|---|---|
| 2,682,522 | 6/1954 | Coover et al. | 528/167 |
| 3,271,329 | 9/1966 | Coover et al. | 260/2 |
| 3,378,523 | 4/1968 | Caldwell et al. | 528/169 |
| 4,086,208 | 4/1978 | Murayama et al. | 528/167 |
| 4,093,595 | 6/1978 | Elliott | 528/279 |
| 4,223,104 | 9/1980 | Kim et al. | 528/169 |
| 4,322,520 | 3/1982 | Schmidt et al. | 528/169 |

FOREIGN PATENT DOCUMENTS

| | | |
|---|---|---|
| 8823 | 3/1980 | European Pat. Off. . |
| 21216 | 1/1981 | European Pat. Off. ............ 528/167 |
| 32300 | 11/1964 | Fed. Rep. of Germany . |
| 1199499 | 8/1965 | Fed. Rep. of Germany . |
| 2751585 | 5/1978 | Fed. Rep. of Germany . |
| 1025422 | of 0000 | United Kingdom . |

*Primary Examiner*—Wilbert J. Briggs, Sr.
*Attorney, Agent, or Firm*—Connolly and Hutz

[57] ABSTRACT

Thermoplastic polyphosphonatocarbonates prepared by polycondensing at least one aromatic dihydroxy compound with a diaryl carbonate and a phosphonic acid diaryl ester in the presence of a catalyst selected from the group consisting of (a) tetra-$C_1$-$C_{18}$-alkyl titanates, (b) di-$C_2$-$C_4$-alkyl-tin oxides, (c) di-$C_2$-$C_4$-alkyl-di-$C_1$-$C_4$-alkoxy-tin compounds, (d) tetra-$C_3$-$C_{18}$-alkyl zirconates, (e) tri-$C_2$-$C_{18}$-alkyl vanadylates and (f) mixtures of germanium dioxide or titanium dioxide and at least one of (a) to (e) in a weight ratio of 1:3 to 3:1 at a temperature of from 80°–340° C. and under a pressure of 600 to 0.1 mm Hg in an inert gaseous atmosphere, the molar ratio of diaryl carbonate to phosphonic diaryl ester being from 5:95 to 95:5 and the molar ratio of aromatic dihydroxy compound to the sum of diaryl carbonates and phosphonic diaryl ester being from 0.91:1 to 0.99:1.

7 Claims, No Drawings

PROCESS FOR THE PREPARATION OF THERMOPLASTIC AROMATIC POLYPHOSPHONATOCARBONATES WITH IMPROVED HEAT-AGEING RESISTANCE, AND THEIR USE

The application relates to a process for the preparation of thermoplastic aromatic polyphosphonatocarbonates with improved heat-ageing resistance, and to their use for the production of shaped articles.

Diaryl carbonates and phosphonic acid diaryl esters are reacted with diphenols in a melt transesterification reaction at elevated temperature, monohydroxyaryls being split off and neutral esters of titanium, zirconium or vanadium, dialkyl-tin oxides, dialkyl-dialkoxy-tin compounds or mixtures of germanium dioxide and one of the abovementioned catalysts being employed as trans-esterification catalysts.

The molar ratio of diaryl carbonate to phosphonic acid diaryl ester is between 5:95 and 95:5, preferably between 15:85 and 85:15, and the molar ratio of diphenols to the sum of diaryl carbonates and phosphonic acid diaryl esters is between 0.91:1 and 0.99:1, preferably 0.93:1 to 0.97:1.

The thermoplastic aromatic polyphosphonatocarbonates prepared by the process according to the invention exhibit a considerably improved heat-ageing resistance compared with polyphosphonatocarbonates which are prepared by the melt trans-esterification process in the presence of alkaline catalysts, the basic catalysts being neutralised at the end of the polycondensation reaction.

It is known (compare German patent application No. P 29 25 208.2 (Le A 19 605)) that thermoplastic aromatic polyphosphonatocarbonates can be prepared by simultaneous trans-esterification of diaryl carbonates and phosphonic acid diaryl esters with diphenols, the trans-esterification catalysts used being alkaline compounds, which can be neutralized at the end of the polycondensation reaction by addition of equimolar amounts of acid compounds, such as, for example, dialkyl sulphates or acid chlorides. The thermoplastic aromatic polyphosphonatocarbonates obtained by this process are thermoplastics with a high fire-repellancy and good properties as constructional materials for use in contact with chemicals, but on heat-ageing for a relatively long period, their relative solution viscosities fall, that is to say molecular weight degradation takes place.

Surprisingly, it has been found that the heat-ageing resistance of these thermoplastic aromatic polyphosphonatocarbonates can be substantially improved if, instead of the alkaline trans-esterification catalysts, $10^{-7}$ to $2.10^{-2}$ mol %, preferably $7.10^{-6}$ to $5.10^{-3}$ mol %, per mol of diphenols employed, of particular, neutral trans-esterification catalysts are used, thereby significantly widening the scope of industrial application of the thermoplastic aromatic polyphosphonatocarbonates.

The invention thus relates to a process for the preparation of thermoplastic aromatic polyphosphonatocarbonates with average molecular weights (number-average $\overline{M}_n$) of at least 11,000, preferably of 11,000 to 200,000 and in particular of 20,000 to 80,000, by transesterification of diaryl carbonates and phosphonic acid diaryl esters with at least one diphenol in the melt in an oxygen-free gas atmosphere, under atmospheric pressure of reduced pressure, in the presence of catalytic amounts of a trans-esterification catalyst, the volatile monohydroxyaryls being distilled off, characterized in that the trans-esterification catalyst employed is at least one catalyst from the group comprising tetra-$C_1$–$C_{18}$-alkyl titanates, di-$C_2$–$C_4$-alkyl-tin oxides, di-$C_2$–$C_4$-alkyl-di-$C_1$–$C_4$-alkoxy-tin compounds, tetra-$C_3$–$C_{18}$-alkyl zirconates and tri-$C_2$–$C_{18}$-alkyl vanadylates, or at least one catalyst from the above group as a mixture with germanium dioxide or titanium dioxide.

The reaction temperatures are between 80° C. and 340° C., preferably between 100° C. and 320° C.; reduced pressure is to be understood as pressures between 600 mm Hg and 0.1 mm Hg, preferably between 350 mm Hg and 1 mm Hg. The reaction time per mol batch is in general 6–10 hours.

Neutral trans-esterification catalysts which are suitable according to the invention are:

(a) Tetra-$C_1$–$C_{18}$-alkyl titanates, such as, for example, titanium tetraethylate, titanium tetrapropylate, titanium tetraisopropylate, titanium tetrabutylate, titanium tetraoctylate and titanium tetrastearate, (b) Di-$C_2$–$C_4$-alkyl-tin oxides, such as, for example, di-isopropyl-tin oxide and dibutyl-tin-oxide, (c) Di-$C_2$–$C_4$-alkyl-di-$C_1$–$C_4$-alkoxy-tin compounds, such as, for example, diisopropyl-dimethoxy-tin, dibutyl-diisopropoxy-tin and dibutyl-dimethoxy-tin, (d) Tetra-$C_3$–$C_{18}$-alkyl zirconates, such as, for example, zirconium tetraacetylacetonate, zirconium tetrabutylate, zirconium tetraoctylate and zirconium tetrastearate, (e) Tri-$C_2$–$C_{18}$-alkyl-vanadylates, such as, for example, vanadyl ethylate, $VO(OC_2H_5)_3$, vanadyl isopropylate, $VO(O\text{-}i\text{-}C_3H_7)_3$ and vanadyl n-butylate, $VO(O\text{-}n\text{-}C_4H_9)_3$, and (f) Mixtures of germanium dioxide or titanium dioxide and at least one of the catalysts listed under (a) to (e).

The catalyst combinations which can be used according to (f) are in a weight ratio of 1:3 to 3:1.

The thermoplastic aromatic polyphosphonatocarbonates which are prepared by the process according to the invention and have average molecular weights (number-average $\overline{M}_n$) of at least 11,000, preferably of 11,000 to 200,000 and in particular of 20,000 to 80,000, correspond to the formula (1)

$$E\text{—}O\text{—}X\text{—}O\text{—}[M\text{—}O\text{—}X\text{—}O]_n\text{—}E \qquad (1)$$

wherein
  E is H or —M—O—Ar,
wherein
  Ar is an aryl radical with preferably 6 to 14 C atoms, in particular phenyl, $C_1$–$C_4$-alkyl-substituted phenyl and/or halogen-substituted (halogen=F, Cl or Br) phenyl,
  M is the connecting member

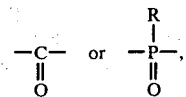

wherein the molar ratio between the connecting members

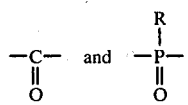

on average is in each case between 5:95 and 95:5, preferably between 15:85 and 85:15,
and wherein R is at least one of the radicals $C_1$–$C_{12}$-alkyl, $C_2$–$C_{12}$-alkenyl or $C_6$–$C_{30}$-cycloalkyl, -cycloalkenyl, -aryl, $C_7$–$C_{30}$-arylalkyl or $C_8$–$C_{30}$-arylalkenyl, the particular aryl groups being unsubstituted or substituted by 1–5 $C_1$–$C_4$-alkyl groups or by 1–5 halogen atoms (such as, for example, F, Cl or Br) or by the alkyl groups mentioned and halogen atoms, X is the radical of a diphenol and can denote

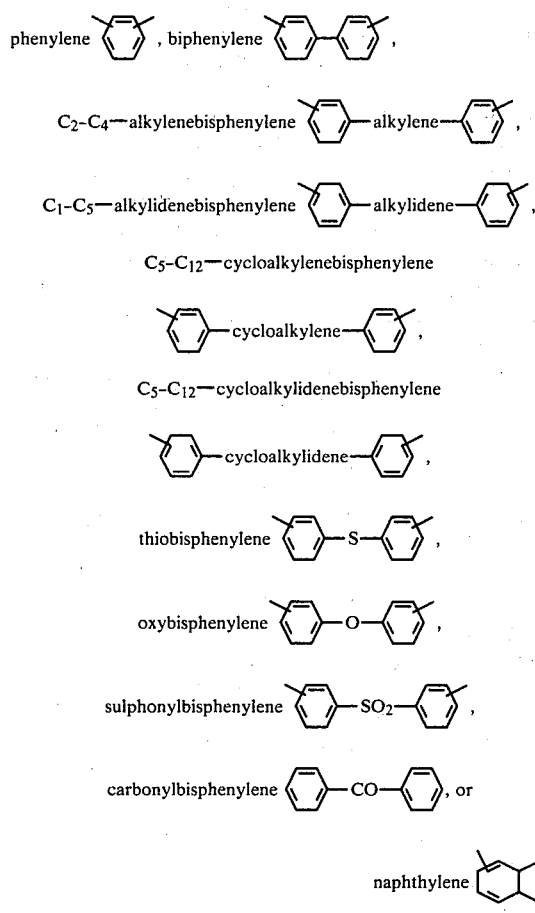

each phenyl nucleus being unsubstituted or substituted by 1–4 $C_1$–$C_4$-alkyl groups or by 1–4 halogen atoms (F, Cl or Br) or by the alkyl groups mentioned and halogen atoms, and the naphthylene nucleus being unsubstituted or substituted by 1–6 radicals of at least one of the groups mentioned or halogen atoms, and n is the average degree of polymerisation resulting from the particular molecular weights $\overline{M}_n$ (number-average) of the polyphosphonatocarbonates of at least 11,000, preferably 11,000 to 200,000 and in particular 20,000 to 80,000.

The polyphosphonatocarbonates obtainable according to the invention can in each case be built up either from diphenol radicals X which are the same or from different, that is to say 2 or more different, diphenol radicals X. The above definitions have the following preferred meanings:

R = at least one of the radicals methyl or phenyl, in particular methyl,

X = at least one of the radicals phenylene, biphenylene, $C_2$–$C_4$-alkylenebisphenylene or $C_1$–$C_5$-alkylidenebisphenylene, it being possible for each phenylene nucleus to be substituted by 1 to 4 methyl groups, or cyclohexylenebisphenylene, cyclohexylidenebisphenylene, thiobisphenylene or sulphonylbisphenylene, in particular $C_1$–$C_4$-alkylidenebisphenylene in which each phenyl nucleus can be substituted by one or two methyl groups, and Ar = phenyl or p-tolyl.

Phosphonic acid diaryl esters which are suitable according to the invention are those of the formula (2)

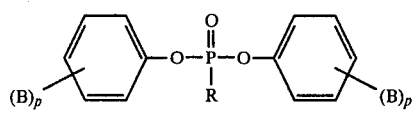

wherein

R has the meaning given in the case of the compounds of the formula (1),

B is a $C_1$–$C_4$-alkyl group and/or F, Cl or Br and p is 0 or an integer from 1 to 5.

Halogen-free alkyl- and aryl-phosphonic acid diphenyl esters are particularly preferred, and methylphosphonic acid diphenyl ester and phenylphosphonic acid diphenyl ester are especially preferred.

Other examples of phosphonic acid diaryl esters which are suitable according to the invention are cyclohexylphosphonic acid diphenyl ester, ethylphosphonic acid diphenyl ester, 2-phenyl-ethylenephosphonic acid diphenyl ester, butylphosphonic acid diphenyl ester and isopropylphosphonic acid diphenyl ester.

Preferred diphenols correspond to the formulae (3) or (4)

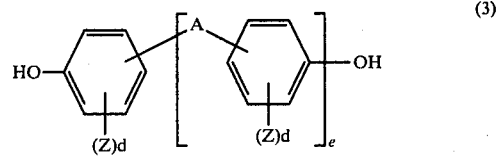

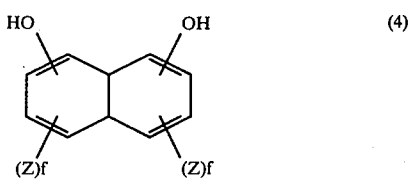

in which

A denotes a single bond, an alkylene group with 2 to 4 C atoms, an alkylidene group with 1 to 5 C atoms, a cycloalkylene group with 5 or 6 C atoms, a cycloalkylidene group with 5 to 6 C atoms, a sulphonyl group, a carbonyl group, oxygen or sulphur, e denotes the number 0 or 1, Z denotes F, Cl, Br or $C_1$–$C_4$-alkyl and several radicals Z in one aryl radical are identical or different, d denotes 0 or an integer from 1 to 4 and f denotes 0 or an integer from 1 to 3.

Particularly preferred compounds of the formula (3) are those in which e denotes 1, A denotes a single bond, the isopropylidene radical, the $SO_2$ group or sulphur and d denotes zero, and in particular 4,4'-dihydroxydiphenyl, 2,2-bis-(4-hydroxyphenyl)-propane (=bisphenol A) and 4,4'-dihydroxydiphenyl sulphone.

Diaryl carbonates which are suitable according to the invention correspond to the formula (5)

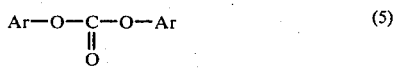

wherein

Ar has the meaning given in the case of the formula (1) and is preferably

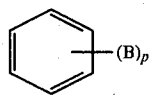

in which B and p have the meaning corresponding to that given in the case of formula (2).

Diphenyl carbonate and di-(p-tolyl) carbonate, for example, are particularly suitable. Diphenyl carbonate is particularly preferred.

The high-molecular thermoplastic aromatic polyphosphonatocarbonates obtained by the process according to the invention can be branched by incorporating small amounts, preferably amounts of between 0.05 and 3.0 mol % (based on 100 mol % of diphenols employed), of compounds which are trifunctional or more than trifunctional, for example those with 3 or more than 3 phenolic hydroxyl groups. Triaryl phosphates, such as, for example, triphenyl phosphate, can also be co-condensed in the polyphosphonatocarbonates as trifunctional branching components in amounts of between 0.05 and 3.0 mol % (based on 100 mol % of the mixture of diaryl carbonate and phosphonic acid diaryl ester employed), whereupon the resulting aromatic polyphosphonatocarbonate is branched by phosphoric acid ester groups.

Examples of some of the branching phenolic compounds with 3 or more than three phenolic hydroxyl groups which can be used are phloroglucinol, 4,6-dimethyl-2,4,6-tri-(4-hydroxy-phenyl)-hept-2-ene, 4,6-dimethyl-2,4,6-tri-(4-hydroxy-phenyl)-heptane, 1,3,5-tri-(4-hydroxyphenyl)-benzene, 1,1,1-tri-(4-hydroxyphenyl)-ethane, tri-(4-hydroxy-phenyl)-phenylmethane, 2,2-bis-[4,4-bis-(4-hydroxy-phenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenyl-methyl)-benzene.

All the starting materials employed for the transesterification should have a purity of >99.1% by weight, preferably >99.6% by weight.

To carry out the process according to the invention, for example, mixtures of 5 to 95 mol % of phosphonic acid diaryl esters of the formula (2) and 95 to 5 mol % of diaryl carbonate of the formula (5) are reacted with 91 to 99 mol %, in particular with 93 to 97 mol %, of diphenols in the presence of $10^{-7}$ to $2.10^{-7}$ mol, in particular $7.10^{-6}$ to $5.10^{-3}$ mol (in each case per 1 mol of diphenol), of one of the neutral trans-esterification catalysts according to the invention, at temperatures between 80° C. and 340° C., preferably between 100° C. and 320° C., whilst passing in an inert gas, such as, for example nitrogen, and under pressures between 600 mm Hg and 0.1 mm Hg, preferably under pressures between 350 mm Hg and 1.0 mm Hg.

The reaction is continued, whilst distilling off the volatile aromatic monohydroxyaryls at elevated temperature, preferably in vacuo, and whilst passing in an inert gas, until the desired degree of condensation is reached.

In addition to nitrogen, carbon dioxide or helium can also be used as the inert gas.

When the polycondensation reaction has ended, the resulting melt of the polyphosphonatocarbonate is converted, in the customary manner, into granules or directly into shaped structures such as films, fibres or bristles. The polyphosphonatocarbonates obtained by the process according to the invention can be processed in the molten state to shaped structures of high heat distortion point by processing units which are customary in industry, such as extruders and injection-moulding machines, and in addition to an outstanding fire-repellancy and good mechanical properties exhibit a significantly improved heat-ageing resistance compared with those polyphosphonatocarbonates which have been prepared by the same process but in the presence of alkaline trans-esterification catalysts.

Thus, for example, a polyphosphonatocarbonate which is prepared by the process claimed, by transesterification in the presence of $2.9.10^{-3}$ mol % of titanium tetrabutylate, is based on 80.15 mol % of diphenyl carbonate, 19.85 mol % of methylphosphonic acid diphenyl ester, 75.56 mol % of bisphenol A and 18.87 mol % of 4,4'-dihydroxydiphenyl sulphone and has a relative solution viscosity $\eta_{rel}$ of 1.356 (measured in a 0.5% strength by weight solution in methylene chloride at 25° C.) exhibits no reduction in the relative solution viscosity (compare Example 2) after storage in air at 100° C. for 10 days. A polyphosphonatocarbonate which has been prepared from the same starting materials but by a procedure analogous to that in German patent application No. P 29 25 208.2 (Le A 19 605) by transesterification in the presence of $7.2.10^{-3}$ mol % of sodium phenolate (see Comparison Example 2), the sodium phenolate being neutralised by an equivalent amount of diethyl sulphate at the end of the polycondensation reaction, and which has a relative solution viscosity of 1.360 exhibits a decrease in the relative solution viscosity $\eta_{rel}$ to 1.302 after storage in air at 100° C. for 10 days.

The polyphosphonatocarbonates obtainable according to the invention are soluble in methylene chloride, 1,1,2,2-tetrachloroethane, chlorobenzene, 1,2-dichlorobenzene, chloroform, 1,1,2-trichloroethylene, dioxane and hexamethylene-phosphoric acid triamide (HMPT), with the exception of polyphosphonatocarbonates of the formula (1) in which X is the thiobisphenylene radical.

The materials customary for polycarbonates, such as pigments, antistatic agents, mould release agents, heat stabilisers, ultraviolet light stabilisers and/or reinforcing fillers, can also be admixed to the aromatic polyphosphonatocarbonates obtainable according to the invention.

The thermoplastic aromatic polyphosphonatocarbonates obtainable according to the invention can be extruded at 240° C. to 320° C. and shaped into test pieces.

The heat distortion point was tested by measuring the Vicat softening point VSP in accordance with the method of DIN 53,460 or ISO/R 75. The behaviour under impact stress was tested both by measuring the impact strength $a_n$ according to Charpy by the method of DIN 53,453 or ASTM D 256, and by measuring the notched impact strength $a_k$ according to Charpy by the method of DIN 53,453 or ASTM D 256. The hardness was determined by measuring the ball indentation hardness HB in accordance with the method of DIN 53,456. The mechanical-elastic properties were examined by stress-strain tests, such as by measuring the flexural E modulus in accordance with the method of DIN 53,457, by measuring the tensile E modulus in accordance with the method of DIN 53,457 and by measuring the tensile strength $\sigma_T$, the elongation at break $\epsilon_T$, the yield strength $\sigma_S$ and the elongation at yield $\epsilon_S$ in accordance with the method of DIN 53,455/1968 or ASTM D 638.

The relative solution viscosities of the polyphosphonatocarbonates according to the invention were measured in 0.5% strength by weight solution in methylene chloride at 25° C.

The burning properties were tested both by measuring the $O_2$ index in accordance with the method of ASTM D 2863-70 and by measuring the after-burn time in accordance with the method of the UL-Test (Subj. 94).

To test the burning properties, test rods with the dimensions: $127 \times 12.7 \times 1.6$ mm (1/16") and $127 \times 12.7 \times 3.2$ mm (⅛") were subjected to the test method of Underwriters Laboratories, Inc. Bulletin 94, Combustion Test for the Classification of Materials.

In this test method, the materials thus tested were classified as UL-94 V-O, UL-94 V-I or UL-94 V-II, and in particular on the basis of the results obtained with 10 samples. The criteria for each of these V classifications according to UL-94 are briefly as follows:

UL-94 V-O: The average period of flaming and/or smouldering after removal of the igniting flame should not exceed 5 seconds and none of the samples should drip particles which ignite absorbent cotton. UL-94 V-I: The average period of flaming and/or smouldering after removal of the igniting flame should not exceed 25 seconds, and none of the samples should drip particles which ignite absorbent cotton.

UL-94 V-II: The average period of flaming and/or smouldering after removal of the igniting flame should not exceed 25 seconds, and the samples drip flaming particles which ignite absorbent cotton.

Furthermore, a test rod which burned for longer than 25 seconds after removal of the igniting flame was not classified according to UL-94 but was designated "burns" under the standard conditions of the present invention. The UL-94 specification furthermore requires that all test rods of an experiment must fulfil the particular V evaluation, otherwise the test rods are given the evaluation of the poorest individual rod. For example, if 1 rod is evaluated as UL-94 V-II and the other 9 test rods are evaluated as UL-94 V-O, all 10 rods are given the evaluation UL-94 V-II.

EXAMPLE 1

3,592 g (16.79 mols) of diphenyl carbonate, 2,068 g (8.34 mols) of methylphosphonic acid diphenyl ester, 2,712 g (11.89 mols) of bisphenol A, 2,214 g (11.90 mols) of 4,4'-dihydroxydiphenyl, 7.6 g ($1.21.10^{-2}$ mol) of 1,4-bis-(4,4''-dihydroxytriphenylmethyl)-benzene and 0.2 g of dibutyl-tin oxide ($3.38.10^{-3}$ mol %) are stirred intensively at 230° C., under nitrogen. Phenol is then distilled off over a column, heated to 100° C., in the course of 3½ hours, at a temperature which is increased from 230° C. to 280° C. and under a pressure which is gradually reduced from 400 mbars to 10 mbars. The reaction is continued for a further 2 hours at 290° C. to 310° C. and under a pressure of 0.3 mbar, the speed of the stirrer being decreased to a constant value. After flushing the autoclave with nitrogen, the polymer formed is allowed to settle for 1 hour with the stirrer switched off and is then isolated by extruding under pressure (about 10 atmospheres) and granulating the extruded strand.

5 kg of an amorphous polyphosphonatocarbonate with a number-average molecular weight $\overline{M}_n$ of 18,100 and a relative solution viscosity $\eta_{rel}$ of 1.331 (measured at 25° C. in 0.5% strength by weight solution in methylene choride) are obtained. Phosphorus content: 4.5%. Glass transition temperature $T_G$: 147° C. (determined by differential thermoanalysis).

The following formula shows a possible theoretical structure of the polyphosphonatocarbonate according to Example 1:

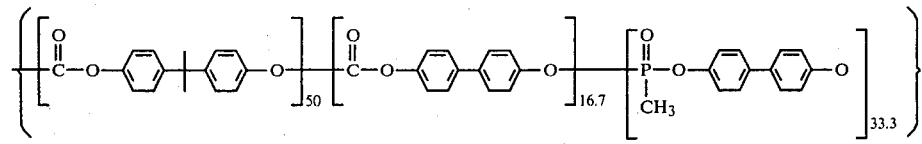

COMPARISON EXAMPLE 1

The procedure followed is analogous to that described in Example 1 of the earlier German patent application No. Le A 19 605.

3,592 g (16.79 mols) of diphenyl carbonate, 2,068 g (8.34 mols) of methylphosphonic acid diphenyl ester, 2,712 g (11.89 mols) of bisphenol A, 2,214 g (11.90 mols) of 4,4'-dihydroxydiphenyl, 7.6 g ($1.21.10^{-2}$ mol) of 1,4-bis-(4,4''-dihydroxytriphenylmethyl)-benzene and 0.2 g ($1.72.10^{-3}$ mol) of sodium phenolate (=$7.23.10^{-3}$ mol %) are stirred intensively at 230° C. under nitrogen. Phenol is then distilled off over a column, heated to 100° C., in the course of 5 hours at a temperature which is increased from 230° C. to 280° C. and under a pressure which is gradually reduced from 400 mbars to 10 mbars. The reaction is continued for a further 5 hours at 290° C. to 310° C. and under a pressure of 0.3 mbar, the speed of the stirrer being decreased to a constant value. After flushing the stirred autoclave with nitrogen, 0.266 g ($1.72.10^{-3}$ mol) of diethyl sulphate are added, the mixture is stirred for 10 minutes and distillation is again carried out for 20 minutes in vacuo. The polymer is then allowed to settle at 300° C. for 1 hour with the stirrer switched off and is subsequently isolated by extruding under pressure (about 10 atmospheres) and granulating the extruded strand, 5 kg of a high-molecular amorphous polyphosphonatocarbonate with a number-average molecular weight $\overline{M}_n$ of 17,000 and a relative solution viscosity $\eta_{rel}$ of 1.327 (measured at 25° C. in a solution of 0.5 g of the polymer in 100 ml of methylene chloride) being obtained. Phosphorus content=4.5%.

The glass transition temperature $T_G$ of the polymer, determined by differential thermoanalysis (DTA), is 147° C.

The following formula represents a possible theoretical structure of the polyphosphonatocarbonate according to Comparison Example 1:

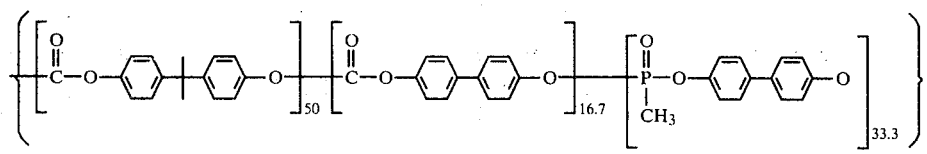

EXAMPLE 2

108 g (0.5047 mol) of diphenyl carbonate, 31 g (0.125 mol) of methylphosphonic acid diphenyl ester, 108.5 g (0.4759 mol) of bisphenol A, 29.7 g (0.1188 mol) of 4,4'-dihydroxydiphenyl sulphone and 10 mg ($2.9.10^{-3}$ mol %) of titanium tetrabutylate are stirred intensively at 230° C., under nitrogen. Phenol is then distilled off over a column, heated to 100° C., in the course of 3½ hours at a temperature which is increased from 230° C. to 300° C. and under a pressure which is gradually reduced from 400 mbars to 20 mbars. The reaction is continued for a further hour at 300° C. to 305° C. and under a pressure of 1.0 mbar. After flushing the reaction vessel with nitrogen, extrusion of the polymer under pressure (10 atmospheres) gives an amorphous polyphosphonatocarbonate which has a number-average molecular weight $\overline{M}_n$ of 19,600 and a relative solution viscosity $\eta_{rel}$ of 1.356. Phosphorus content: 2.34% $T_G$ (determined by DTA)=156° C.

The following formula represents a possible theoretical structure of the polyphosphonatocarbonate according to Example 2:

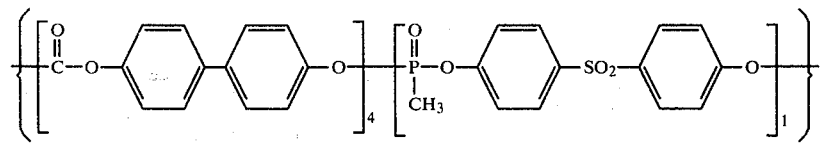

COMPARISON EXAMPLE 2

The procedure followed is analogous to that in the earlier German patent application No. Le A 19 605.

108 g (0.5047 mol) of diphenyl carbonate, 31 g (0.1250 mol) of methylphosphonic acid diphenyl ester, 108.5 g (0.4759 mol) of bisphenol A, 29.7 g (0.1188 mol) of 4,4'-dihydroxydiphenyl sulphone and 5 mg ($7.2.10^{-3}$ mol %) of sodium phenolate are reacted with one another under nitrogen and under the same reaction conditions as described in Comparison Example 1, phenol being split off. When the polycondensation reaction has ended, 6.65 mg ($7.2.10^{-3}$ mol %) of diethyl sulphate are added, the mixture is stirred at 300° C. for 10 minutes and distillation is again carried out for 20 minutes in vacuo. The polymer is then isolated and a polyphosphonatocarbonate which has a number-average molecular weight $\overline{M}_n$ of 19,700 and a relative solution viscosity $\eta_{rel}$ of 1.360 is obtained. Phosphorus content: 2.34%. $T_G$ (determined by DTA): 156° C.

The formula given in Example 2 represents a possible theoretical structure of the polyphosphonatocarbonate.

Films 50μ thick were produced from methylene chloride solutions of the polyphosphonatocarbonates of Examples 1 and 2 and of Comparison Examples 1 to 2 and were heated at 100° C. in air. Samples of the films were taken at fixed intervals of time and the relative solution viscosities were determined in a 0.5% strength by weight solution in methylene chloride at 25° C. The $\eta_{rel}$ values measured are summarized comparatively in Table 1.

TABLE 1

| Time difference (days) | $\eta_{rel}$ values of the polymers of: | | | |
|---|---|---|---|---|
| | Example 1 | Comparison Example 1 | Example 2 | Comparison Example 2 |
| 0 | 1.331 | 1.327 | 1.356 | 1.360 |
| 2 | 1.330 | 1.315 | 1.357 | 1.348 |
| 4 | 1.331 | 1.302 | 1.356 | 1.336 |
| 5 | 1.332 | 1.295 | 1.355 | 1.330 |
| 7 | 1.330 | 1.284 | 1.356 | 1.319 |
| 10 | 1.331 | 1.265 | 1.355 | 1.302 |

The fire-repellancy values and characteristic mechanical values of the polyphosphonatocarbonates according to Example 1 and Comparison Example 1 are almost identical and can be found in Table 2.

TABLE 2

| Test | Test standard | Test values | |
|---|---|---|---|
| | | Example 1 | Comparison Example 1 |
| O₂ index | ASTM- | 59% | 59% |
| UL test (Subj. 94) | 2863-70 | V-O (1/16″) | V-O (1/16″) |
| Vicat B temperature | DIN 53 460 | 141° C. | 141° C. |
| Impact strength $a_n$ | DIN 53 454 | unbroken | unbroken |
| Notched impact strength $a_k$ | DIN 53 453 | 21 | 20 |
| Ball indentation hardness HB | DIN 53 456 | 110 MPa | 112 MPa |
| Flexural E modulus | DIN 53 457 | 2400 MPa | 2300 MPa |
| Tensile E modulus | DIN 53 457 | 2450 MPa | 2400 MPa |
| Yield strength $\sigma_s$ | DIN 53 455 | 64 MPa | 66 MPa |
| Elongation at yield $\epsilon_s$ | DIN 53 455 | 9% | 9% |
| Tensile strength $\sigma_T$ | DIN 53 455 | 61 MPa | 61 MPa |
| Elongation at break $\epsilon_T$ | DIN 53 455 | 60% | 59% |

EXAMPLE 3

4,020 g (18.79 mols) of diphenyl carbonate, 1,552 g (6.62 mols) of methylphosphonic acid diphenyl ester, 4,472 g (19.61 mols) of bisphenol A, 1,108 g (5.96 mols) of 4,4'-dihydroxydiphenyl, 7.6 g ($1.21.10^{-2}$ mol) of 1,4-bis-(4,4''-dihydroxytriphenylmethyl)-benzene and 0.2 g ($5.22.10^{-4}$ mol = $2.04.10^{-3}$ mol %) of zirconium n-butylate are reacted by a procedure analogous to that described in Example 1. 5.1 kg of an amorphous polyphosphonatocarbonate having the theoretical structure

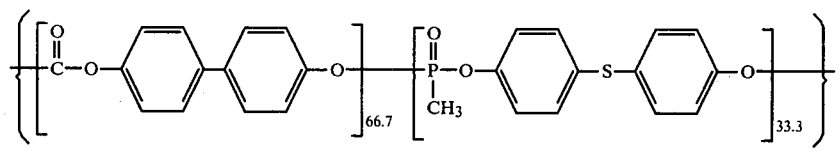

are reacted by a procedure analogous to that described in Example 2. The resulting polyphosphonatocarbonate of the theoretical structure

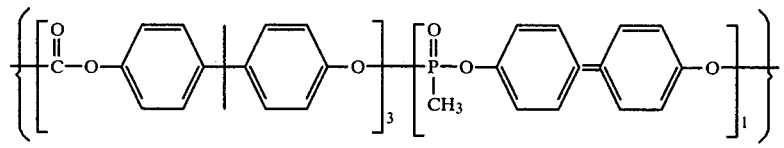

has the following characteristic data: $\eta_{rel}$: 1.374; $\overline{M}_n$: 22,600; phosphorus content: 2.93%; sulphur content: 3.03%; $T_G$ (determined by DTA): 120° C.

EXAMPLE 5

155.1 g (0.6254 mol) of methylphosphonic acid diphenyl ester, 7.04 g (0.0329 mol) of diphenyl carbonate, 113.6 g (0.6108 mol) of 4,4'-dihydroxydiphenyl and 10 mg ($5.6.10^{-3}$ mol %) of dibutyl-dimethoxy-tin are reacted by a procedure analogous to that described in Example 2. The resulting polyphosphonatocarbonate of the theoretical structure

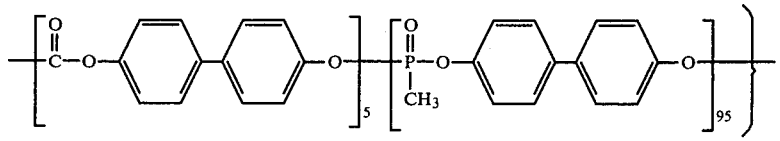

are obtained. The polyphosphonatocarbonate has the following characteristic analytical data: $\overline{M}_n$: 16,000; $\eta_{rel}$: 1.308; phosphorus content: 3.1%; $T_G$ (determined by DTA): 148° C.

The fire-repellancy values and characteristic mechanical values of the polyphosphonatocarbonate according to Example 3 are identical to those of the polyphosphonatocarbonate from Example 2 of the earlier German patent application No. Le A 19 605.

EXAMPLE 4

89.8 g (0.4196 mol) of diphenyl carbonate, 51.7 g (0.2084 mol) of methylphosphonic acid diphenyl ester, 0.15 g ($0.45.10^{-3}$ mol) of triphenyl phosphate, 90.5 g (0.3969 mol) of bisphenol A, 43.25 g (0.1984 mol) of 4,4'-dihydroxydiphenyl sulphide and 5 mg ($3.44.10^{-3}$ mol %) of vanadyl isopropylate has the following characteristic data: $\eta_{rel}$: 1.318; $\overline{M}_n$: 25,700; phosphorus content: 12.1%; $T_G$ (determined by DTA): 139° C.

EXAMPLE 6

133.8 g (0.6254 mol) of diphenyl carbonate, 8.16 g (0.0329 mol) of methylphosphonic acid diphenyl ester, 139.3 g (0.6108 mol) of bisphenol A and 5 mg of a mixture of germanium dioxide and titanium tetrabutylate in a weight ratio of 1:1 ($\leq 5.7.10^{-3}$ mol %) are reacted by a procedure analogous to that described in Example 2. The resulting polyphosphonatocarbonate of the theoretical structure

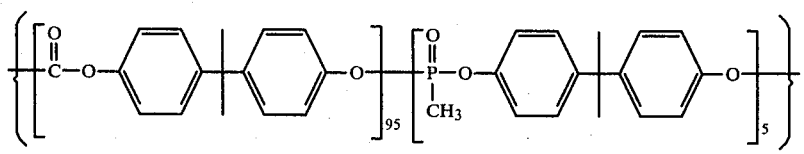

has the following characteristic data: $\eta_{rel}$: 1.302; $M_n$: 24,200; phosphorus content: 0.6%; $T_G$ (determined by DTA): 143° C.

We claim:

1. A process for preparing an aromatic, thermoplastic polyphosphonatocarbonate of improved heat-ageing resistance which comprises polycondensing (A) at least one aromatic dihydroxy compound having 6 to 30 carbon atoms with (B) a diaryl carbonate having 6 to 14 carbon atoms in each aryl moiety and (C) a phosphonic acid diaryl ester having 6 to 14 carbon atoms in each aryl moiety in the presence of $10^{-7}$ to $2.10^{-2}$ mole percent, per mole of aromatic dihydroxy compound, of at least one catalyst selected from the group consisting of (a) tetra-$C_1$-$C_{18}$-alkyl titanates, (b) di-$C_2$-$C_4$-alkyl-tin oxides, (c) di-$C_2$-$C_4$-alkyl-di-$C_1$-$C_4$-alkoxy-tin compounds, (d) tetra-$C_3$-$C_{18}$-alkyl zirconates, (e) tri-$C_2$-$C_{18}$-alkyl vanadylates and (f) mixtures of germanium dioxide or titanium dioxide with at least one of the catalysts listed under (a) to (e), in a weight ratio of 1:3 to 3:1 at a temperature of from 80°–340° C. and under a pressure of from 600 to 0.1 mm Hg in an inert gaseous atmosphere, the molar ratio of (B) to (C) being from 5:95 to 95:5 and the molar ratio of (A) to the sum of (B) and (C) being from 0.91:1 to 0.99:1.

2. The process of claim 1 wherein said reaction is carried out at a temperature of from 100° to 320° C.

3. The process of claim 1 wherein the reaction is carried out at a pressure of 350 to 1.0 mm Hg.

4. The process of claim 1 wherein the molar ratio of (B) to (C) is from 15:85 to 85:15.

5. The process of claim 1 wherein (A), (B) and (C) are polycondensed with 0.05 to 3 mole percent, based on 100 mole percent of (A), of a branching agent having at least three phenolic —OH moieties.

6. The process of claim 1 wherein (A), (B) and (C) are polycondensed with 0.05 to 3 mole percent, based on 100 mole percent of the sum of (B) and (C), of a branching agent which comprises triaryl phosphate.

7. The process of claim 1 wherein component (A) is a compound of the formula

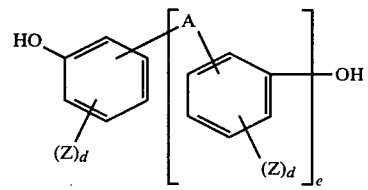

or

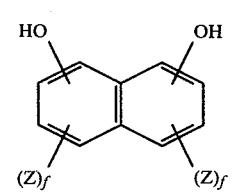

wherein
A is a single bond, alkylene having 2 to 4 carbon atoms, alkylidene having 1 to 5 carbon atoms, cycloalkylene having 5 or 6 carbon atoms, cycloalkylidene having 5 or 6 carbon atoms, sulphonyl, carbonyl, oxygen or sulphur;
e is the number 1 or zero;
Z is fluoro, chloro, bromo or alkyl having 1 to 4 carbon atoms;
d is zero or an integer from 1 to 4; and
f is zero or an integer from 1 to 3;
component (B) is a compound of the formula

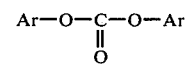

wherein Ar is aryl having 6 to 14 carbon atoms; and
component (C) is a compound of the formula

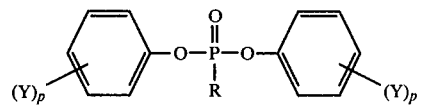

wherein Y is alkyl having 1 to 4 carbon atoms, F, Cl, or Br;
p is zero or an integer from 1 to 5 and R is alkyl having to 12 carbon atoms, alkenyl having 2 to 12 carbon atoms, cycloalkyl having 6 to 30 carbon atoms, cycloalkenyl having 6 to 30 carbon atoms, aryl having 6 to 30 carbon atoms, arylalkyl having 7 to 30 carbon atoms, or arylalkenyl having 8 to 30 carbon atoms with the aryl moieties being unsubstituted or substituted by one to five alkyls having 1 to 4 carbon atoms, one to five halogens or both alkyl and halogen.

* * * * *